United States Patent [19]

Vranish et al.

[11] Patent Number: 4,707,013
[45] Date of Patent: Nov. 17, 1987

[54] SPLIT RAIL PARALLEL GRIPPER

[75] Inventors: John M. Vranish, Crofton, Md.;
Wayne R. Bunch, Lovettsville, Va.;
William L. Johns, Pecatonica, Ill.

[73] Assignee: The United States of America as represented by the Secretary of Commerce, Washington, D.C.

[21] Appl. No.: 868,485

[22] Filed: May 30, 1986

[51] Int. Cl.$^4$ .............................................. B25J 15/08
[52] U.S. Cl. .................................. 294/119.1; 294/88; 901/37; 901/39
[58] Field of Search ............... 294/67.33, 81.54, 81.62, 294/88, 103.1, 119.1; 74/29, 30, 109; 269/227, 285; 414/741; 901/31, 36–39; 279/117

[56] References Cited

U.S. PATENT DOCUMENTS

| 3,199,910 | 8/1965 | Bradley | 294/119.1 |
| 3,727,965 | 4/1973 | Cranston et al. | 294/119.1 X |
| 4,591,198 | 5/1986 | Monforte | 901/39 X |

FOREIGN PATENT DOCUMENTS

| 2147268 | 5/1985 | United Kingdom | 294/119.1 |
| 848352 | 7/1981 | U.S.S.R. | |

OTHER PUBLICATIONS

"Needle Roller and Flat Cage Assemblies", *INA Technical Manual*, pp. 120–121, Apr. 9, 1985.
*THK America, Inc. Technical Manual*, THK Co., Ltd., Apr. 9, 1985.
*IBM Technical Disclosure Bulletin*, vol. 23, No. 11, Apr. 1981, "Linear Robotic Gripper", by Cummins et al.

*Primary Examiner*—Johnny D. Cherry
*Attorney, Agent, or Firm*—Alvin J. Englert; Harold L. Novick

[57] ABSTRACT

A wide-throw parallel-action gripper of the split-rail design is disclosed. The gripper includes a pair of preloaded linear bearings which engage the outward surfaces of each rail and two roller bearings spaced on either side of a pinion, all mounted onto a pinion shaft, which engage the inward sides of each rail. A single finger is mounted at opposed ends of each rail and an actuator is connected either to one of the rails or to the central pinion. The actuators can include a pneumatic cylinder of electrical stepping motors or D.C. servo motors.

20 Claims, 11 Drawing Figures

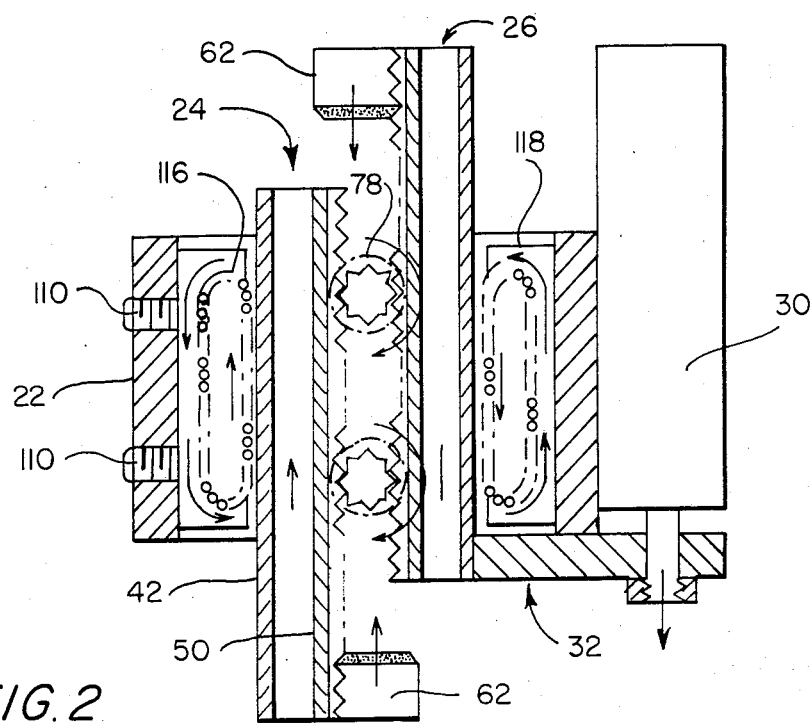
FIG. 2
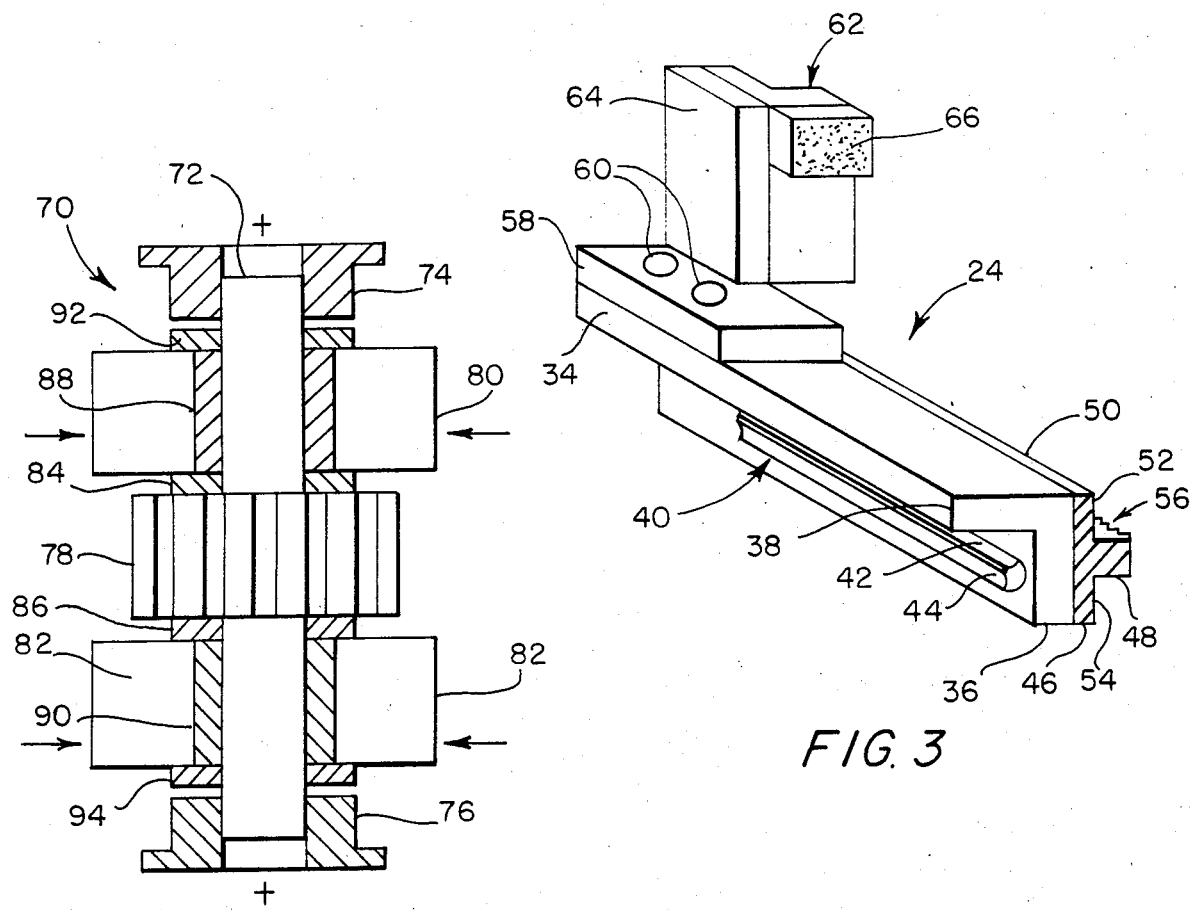
FIG. 4
FIG. 3

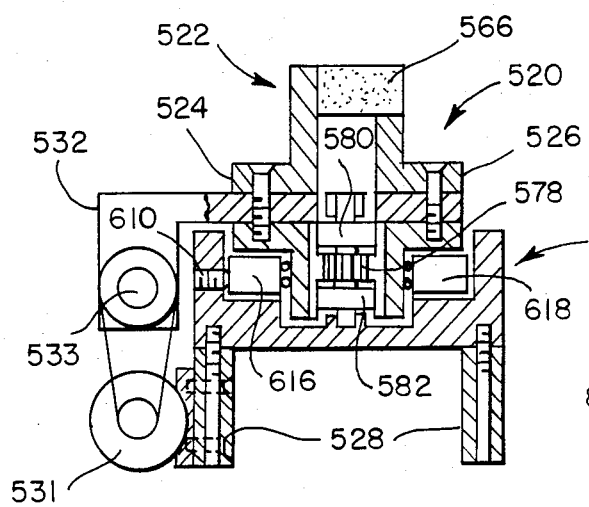
FIG. 9
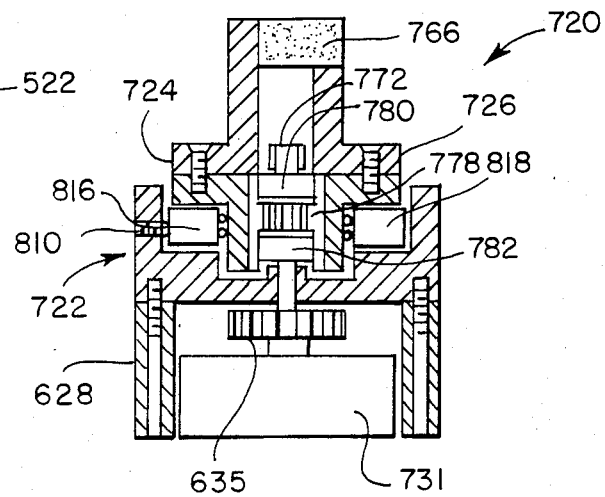
FIG. 10
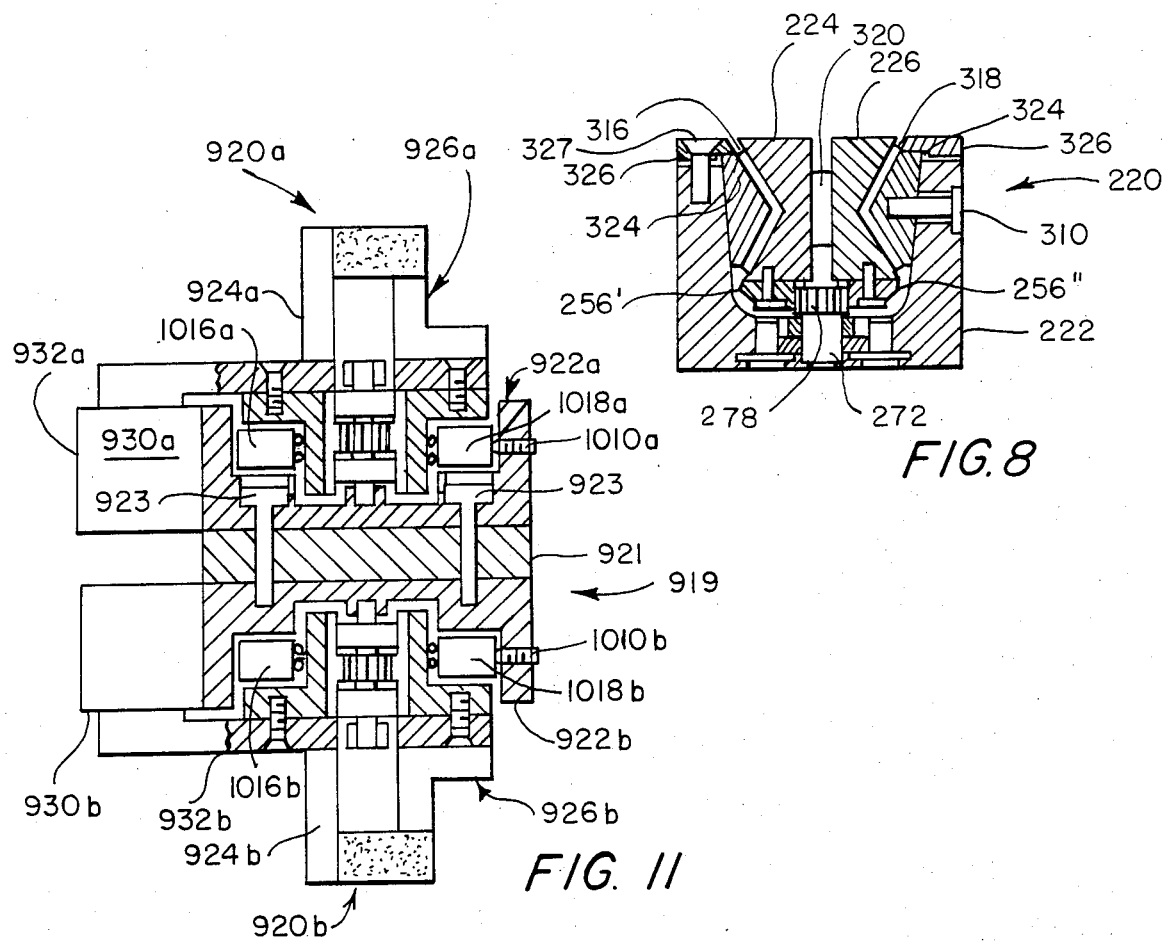
FIG. 8
FIG. 11

4,707,013

SPLIT RAIL PARALLEL GRIPPER

FIELD OF THE INVENTION

The present invention relates to robot manipulators, and in particular relates to remotely operable grippers that can be positioned by robot arms and used to grasp, hold and move various objects, such as machine tool parts.

BACKGROUND OF THE INVENTION

In the present industrial environment, there is a continuous need to have rugged and reliable machinery with a long lifetime, yet on the other hand, to have machinery that can be usable in a hostile environment which contains flying metal chips (e.g. from grinding and cutting operations) atmospheric particulate such as in a painting environment, and oil, and which has vibrations and other conditions harmful to machinery. There is also a need for machinery that can be used in such an environment, yet can be automatically controlled with a high degree of precision. In many cases, robots are being used in these environments to satisfy the conflicting requirements. Robots are used to perform simple and complex tasks, ordinary and dangerous functions, and brute strength movements of bulky and heavy components and precise manipulation of delicate parts.

Where robots are used, either tools are attached to movable robot arms or manipulators are attached to the arms so that objects can be grasped, lifted, and manipulated. However, there is the contradictory requirements of having a manipulator that is strong and able to grasp heavy objects with little deflection in order to maintain the accuracy, yet on the other hand still be lightweight itself, simple in design, compact in size, and accurately and repeatedly positionable with extremely small tolerances. At the same time, such a manipulator or gripper must be usable in the destructive environment that exists in the manufacturing locations.

The prior art discloses that one type of gripper usable with robots is comprised of two jaws that are relatively movable with respect to each other by a rack and pinion drive mechanism. One such example is disclosed in the Soviet Union Pat. to Baskarev No. 848,352 issued July 23, 1981. However, while the use of rack and pinion grippers satisfy many of the aforementioned requirements, they usually are deficient in their accuracy, responsiveness, and smooth action so that there is no binding and so that a known amount of operating torques can be applied to the gripper arms with a known applied force to the objects being gripped.

SUMMARY OF THE INVENTION

A split rail parallel gripper according to the present invention overcomes the aforementioned disadvantages. In particular, grippers according to the present invention are a high performance wide throw parallel action gripper that is lightweight and compact, thereby permitting use of such a gripper on small robots (4.5 Kg, 10 lb capacity). At the same time, the present grippers are strong, rigid and have a wide throw, thereby satisfying requirements for use on large robots (90 Kg, 200 lb capacity). The parallel action of the present grippers do not bind in the presence of torques and other forces, and thus are suitable for varied applications. However, the present invention still satisfies the requirements for use with both pneumatic cylinders and more sophisticated control system such as air servo systems, stepping motors and direct current servo motors. The present features of simplicity, low cost and a wide range of compatibility with various sizes of pneumatic cylinders make the present invention practical for use as a general purpose air actuated gripper, yet its accuracy, smooth acting motion and responsiveness make it compatible with the more sophisticated control systems.

According to the present invention, the aforementioned apparently conflicting design goals and features are reconciled by using the simplicity of a split rail design and obtaining responsiveness and accuracy by using a unique combination of double row linear bearings on one side of the rail and roller bearings on the other side of the rail. In a specific embodiment, the other bearing is a row of needle roller bearings. The present invention reduces sliding friction by eliminating linkages and rail guides. At the same time, the present invention is compact, light, simple, and suitably rugged and practical for industrial use in adverse environments in which metal chips, paint and oil are present.

According to one embodiment of the present invention, a gripper comprises a frame and a parallel rack and pinion drive subassembly mounted on the frame. The drive subassembly comprises a rotatable pinion and a first and second rack slidably mounted in operable engagement on corresponding sides of the pinion. The rails have an inner bearing surface facing the pinion and an opposite outer bearing surface facing away from the pinion. The gripper further includes first and second gripper fingers mounted respectively on the first and second rails and bearing means mounted on either side of the racks. The bearing means includes first and second linear bearings mounted on the frame for engaging one of the inner and outer bearing surfaces respectively of the first and second rails and a first and second bearing means mounted on the frame for engaging the other bearing surface respectively of the first and second rails.

In a particular embodiment of the present invention, each rail is constrained on its outboard side by an antifriction linear motion duplex-angular contact bearing and constrained on its inboard side by roller bearings. A rack and pinion subassembly synchronizes the movement of the rails with respect to each other. The rails, bearings and rack and pinion subassemblies are mounted in a frame or housing and preloaded with set screws in the frame. Such a gripper system is self aligning and self adjusting and produces a minimum sliding friction. Power can either be supplied to one rail and through the rack and pinion subassembly transferred to the other rail, or can be applied to the pinion which in turn drives the rack simultaneously. In the first arrangement, gripper fingers mounted on the distal ends of the rails move twice the distance with respect to each other as the throw of the actuator. On the other hand, the gripping force is one half of the actuator force. For example, an actuator throw of 7.6 cm (3 in) provides a gripper throw of 15.2 cm (6 in).

In the split rail design of the present invention, the gripper part that normally functions as the movable load platform is bolted to the robot wrist and thus becomes the fixed member. By splitting the rail into two components separated by the bearing design of the present invention, the rails move with respect to each other while retaining accuracy, low friction, strength and rigidity that is inherent in the fixed rail design. In a further embodiment of the present invention, the roller bearings are mounted onto the pinion shaft on either side of a pinion rigidly mounted to the shaft. Accordingly, the present invention provides a versatile, high performance and general purpose gripper for robots.

Other features, advantages and objectives of the present invention are set forth in or will be apparent from the detailed description of the presently preferred embodiments contained hereinbelow.

BRIEF DESCRIPTION OF THE DRAWINGS

FIG. 2 is a diagrammatic top plan view of the present invention adapted for explaining the operation thereof;

FIG. 3 is a perspective view of the rail subassembly;

FIG. 4 is a diagrammatic side elevational view taken in cross section of the pinion and roller bearing subassembly;

FIG. 8 is a cross sectional view taken along line 8—8 in FIG. 7;

FIGS. 9 and 10 are diagrammatic cross sectional views illustrating two different drive schemes in which the gripper assembly can be used, FIG. 9 depicting a lead screw and ball nut coupling driven by a stepping motor and FIG. 10 depicting a gear coupling driven by a pancake stepping motor; and FIG. 11 is a diagrammatic cross sectional view illustrating a two-handed gripper assembly formed by two stacked gripper subassemblies both according to the present invention.

DETAILED DESCRIPTION OF THE PREFERRED EMBODIMENTS

With reference now to the figures in which like numerals represent like elements throughout the several views and in which like elements in different embodiments are represented by the same tens and units digit, but by a different hundreds digit, a parallel gripper 20 according to a first embodiment of the present invention is depicted in FIGS. 1 and 3 through 6.

Figure 1:
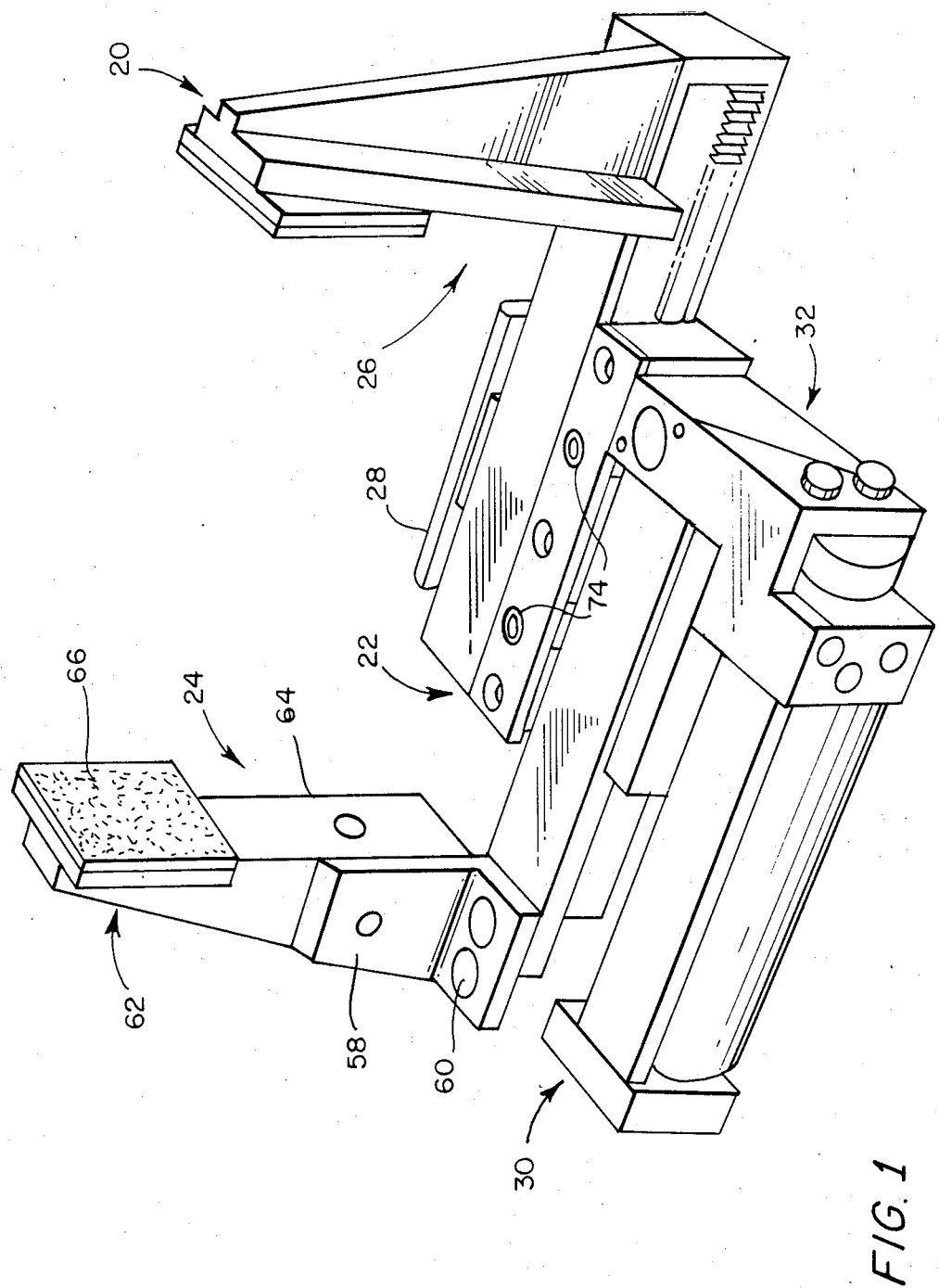
FIG. 1 is a perspective view of a split rail parallel gripper assembly according to one presently preferred embodiment of the invention.

Gripper 20 includes an elongate frame or housing 22 in which first and second rails 24 and 26 are mounted for slidable motion in the longitudinal direction as depicted in FIG. 1. Gripper 20 also includes a mounting plate 28 attached to one longitudinal side of housing 22 for mounting gripper 20 onto a frame or robot arm (not shown). Located transversely opposite mounting plate 28 is a motive means for operating gripper 20, which in the embodiment depicted in FIG. 1 is an air cylinder 30 connected to second rail 26 in a manner described in greater detail hereinbelow.

Figure 6:
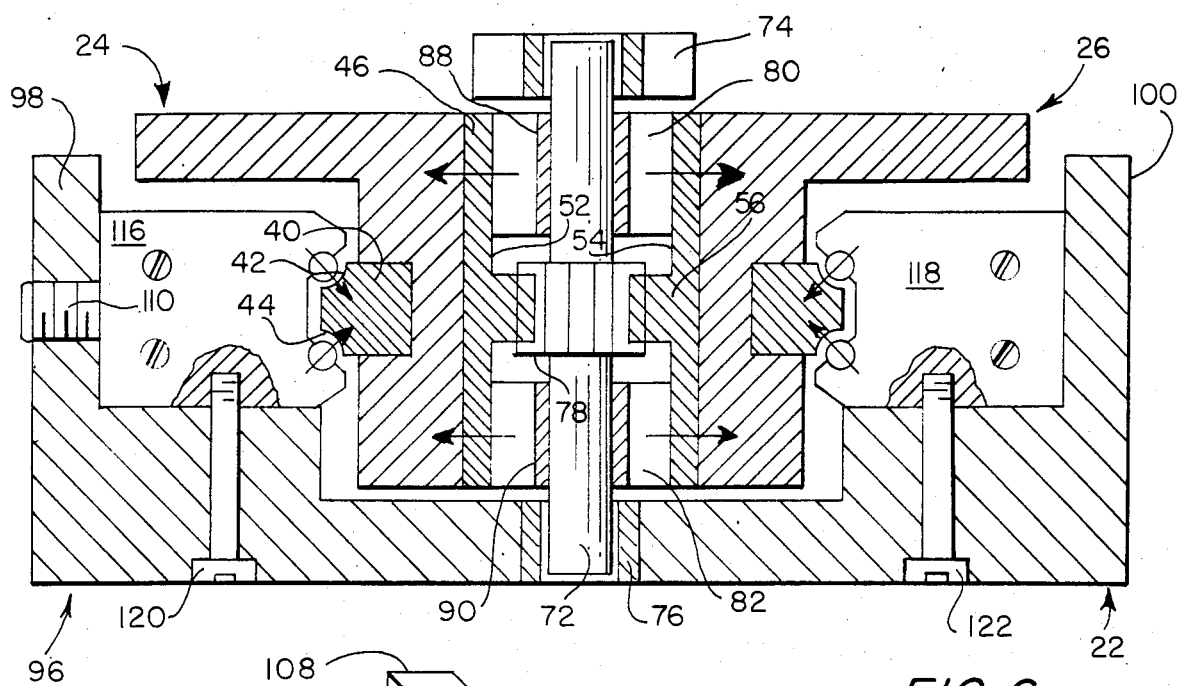
FIG. 6 is a diagrammatic cross sectional view of the present invention adapted for explaining the operation thereof.

With particular reference now to FIG. 3, first rail 24 will be described in greater detail. Second rail 26 is substantially similar to first rail 24, except that it includes a linkage 32 (FIG. 1) for mounting second rail 26 to air cylinder 30. First rail 24 comprises an inverted, L-shaped elongate frame 34 having a vertically extending member 36 and a horizontally extending member 38. Mounted to the outboard side of rail frame vertical member 36 is a bearing bar 40 having an upper circular arch 42 and a lower circular arch 44 as seen in FIGS. 3 and 6. Bearing bar 40 is preferably comprised of case hardened steel and provides an elongate upper and lower bearing surface for receiving the balls of a linear bearing, described in greater detail hereinbelow. Mounted on the opposite and inboard side of rail frame vertical member 36 is a strip 46 having a T-shaped cross section. T-strip 46 is preferably made of tool steel. T-strip 46 includes a base portion 48 that extends in the inboard transverse direction and a cap portion 50 which provides an upper roller bearing surface 52 and a lower roller bearing surface 54. The bottom of T-strip base portion 48 has a plurality of spaced V notches which form a rack 56. A mounting block 58, preferably made of 7075-T6 aluminum, is mounted to the top of rail frame horizontal member 38 with two flat head screws 60. In the presently preferred embodiment, mounting block 58 is mounted at the extreme outer end of rail 24. A cantilever mounted gripper finger 62 is in turn mounted on top of mounting block 58. It is noted that gripper finger 62 is depicted slightly different in FIG. 3 than in FIG. 1. In both cases, however, gripper finger 62 comprises a mounting base 64 having a portion that extends transversely inwardly and a finger portion 66, preferably comprised of a rubber pad, mounted at the top longitudinally inwardly facing surface of mounting base 64.

With reference to FIG. 4, a pinion and roller bearing subassembly 70 is depicted. Subassembly 70 comprises a vertically mounted pinion shaft 72 mounted in an upper and lower bushing 74 and 76, preferably made of bronze and mounted in housing 22 as described hereinbelow. A pinion 78 is centrally, rigidly mounted to pinion shaft 72 and is comprised of a plurality of teeth having dimensions and spacings so as to be operably engageable with rack 56. Located on either side, that is the upper and lower sides, of pinion 78 are an upper roller bearing 80 and a lower roller bearing 82. Roller bearings 80 and 82 are preferably made of tool steel and have a length and diameter set to provide maximum strength, to retard brinelling, and to maintain the spacing between rack 56 and pinion 78. Preferably, graphite impregnated upper and lower thrust bearings 84 and 86 are located between upper and lower roller bearings 80 and 82 and centrally located pinion 78, respectively. Graphite impregnated delrin plain bearings 88 and 90 are respectively located between upper and lower roller bearings 80 and 82 and pinion shaft 72. Also, as shown in FIG. 4, a top and bottom thrust bearing 92 and 94, also preferably impregnated with graphite, are located between the respective top and bottom of roller bearings 80 and 82 and bushings 74 and 76, respectively.

Thus, roller bearings 80 and 82 are split and independently mounted on pinion shaft 72 with pinion 78 located between them. This design permits roller bearings 80 and 82 to rotate at a different angular velocity than pinion 78, which is necessary because their respective diameters are different. Furthermore, the graphite impregnated upper and lower thrust bearings 84 and 86 provide a low friction rotation between pinion 78 and upper and lower roller bearings 80 and 82 and also keep them and pinion 78 in alignment, even when the system is deflecting from externally applied forces and torques.

Figure 5:
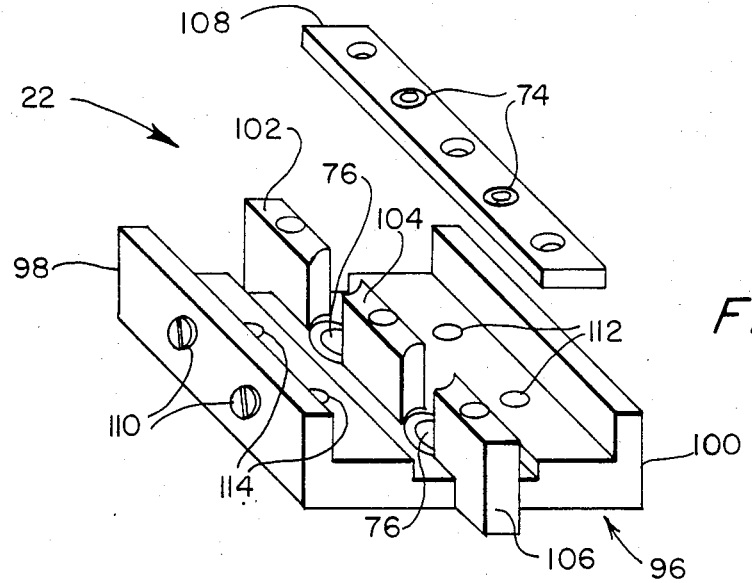
FIG. 5 is a somewhat diagrammatic, exploded perspective view of the frame subassembly on which the rail subassembly depicted in FIG. 3 is mounted.

Housing 22 is shown in greater detail in FIG. 5. As described above, housing 22 provides a means for bolting gripper 20 to the wrist of a robot and also provides an anchor for the bushings and pinion shaft 72 and a means through which set screw preload forces can be applied to the system, as described below. Housing 22 is preferably comprised of a U-shaped channel base 96 having upstanding sides 98 and 100. Housing 22, is shown particularly in FIG. 5, provides for two identical pinion and roller bearing subassemblies and thus provides the anchor for two lower bushings 76. Integrally mounted to housing base 96 and spaced on either side and between the two subassembles 76 are three vertically extending studs 102, 104 and 106 which are integrally attached to housing base 96. A top plate 108 is rigidly mounted to the tops of studs 102, 104 and 106 with screws (only the holes of which are depicted in FIGS. 1 and 5). Top plate 108 also mounts upper bushings 74. The holes in housing 22 for bushings 74 and 76 are slightly elongated in the transverse direction, but have a size so as to constrain the bushings to less than 0.2 mm movement in the longitudinal direction. The slots in the frame preferably permit the bushings to move as much as 1 mm in the transverse direction. Thus, pinions 78 and roller bearings 80 and 82 are free to rotate and self align along the transverse direction in response to a preload established by two preload screws 110 in housing side 98. Housing 22 is also provided with two sets 112 and 114 of two holes per set and to hold linear bearings 116 and 118 with screws 120 and 122, respectively, as shown in FIG. 6. As stated above, while pinions 78 and roller bearings 80 and 82 are free to rotate and self align in a transverse direction in response to the preload, accuracy of gripper 20 is still maintained by constraining the width of the slot, thus minimizing movement of pinion shaft 72 in the longitudinal direction.

Linear bearings 116 and 118, depicted in FIG. 6, are preferably antifriction linear motion duplex-angular type bearings, such as those manufactured by THK America, Inc. of Elk Grove Village, Illinois. These bearings have a low profile and a highly rigid linear motion mechanism. They permit clearance adjustment to be easily accomplished and can be easily preloaded. The THK bearing includes a bearing block and a rail and two raceways on one side of the bearing block. This causes two rows of rolls to be retained and to recirculate through the use of a retainer and end plates. The unit is constructed in such a manner that each of the two rows of balls rolling over the rail comes in contact with the elliptical raceway of bearing surfaces 42 and 44. It is thus capable of withstanding loads in any direction when used as a set such as depicted in FIG. 6. As shown by the arrows in FIG. 6, the two racks of ball bearings of linear bearings 116 and 118 transmit forces to two surfaces of bearing bar 40 each of which are at right angles to the other. According to the manufacturing data produced by THK, suitable linear bearings having a code name LM Guide HR and having dimensions of two small bearings each of a height of 15 mm, a width of 30 mm, and a length of 69 mm can carry 1,160 Kgf in static load and 760 Kgf of dynamic load. See also FIGS. 4 and 2.

In a prototype of the present invention, gripper 20 can grasp an object with a force of 450 N(100 lb) per finger and can lift a 45.4 Kg (100 lb) object with a deflection of no more than 0.4 mm (0.015 in) at the 115 cm fingertips. These figures represent the maximum grasping forces that a large load capacity robot normally applies to a general purpose gripper and the maximum load that is normally lifted. The deflection is that of the typical repeatability figures given for large capacity robots. In addition, the gripper had a repeatability error of less than 0.1 mm (0.004 in). The repeatability requirement makes the present invention suitable for use with a servo control system. The gripper also was operable when subject to an air pressure differential as low as 3.5 $\times 10^4$ pascals (5 psig). This responsiveness ability permits gripper 20 to be used with air servo systems. Gripper 20 was also able to open and close when subjected to a side torque of 230 NM (200 in-lbs) about the axis parallel to the rails while being driven by a 360N (80 lbs) force actuator. This ability of the present invention to operate with such large side torques permits it to be used with large capacity robots in applications in which such large side torques are encountered.

The prototype gripper weighs only 2.27 Kg (5 lbs) with a 0.454 kg (1 lb) 2.86 cm (1 1/8 in) diameter air cylinder attached. The maximum length of gripper 20 is 23.8 cm (9⅜ in) when the fingers are closed and is 14 cm (5½ in) wide with air cylinder 30 attached and 3.81 cm (1½ in) in height not counting gripper fingers 62. A pair of 115 cm (4.5 in) long fingers are attached to the outermost ends of first and second rails 24 and 26 and carry a 3 cm (1.125 in) thick finger pad 66. The throw of the prototype gripper is 16.5 cm (6.5 in).

The repeatability of the prototype was found superior to that achieved with traditional rack and pinion gear tolerances. The increased repeatability occurs because of the frictional forces exerted by roller bearing rollers 80 and 82 on rails 24 and 26 as the rollers rotate. This frictional force exerted in the direction of the arrows in FIG. 6 moves the rails through the rack and pinion backlash region, thus enhancing the repeatability of the system.

With reference now to FIG. 2, operation of gripper 20 will be explained. A mode of force in this particular embodiment is provided by a pneumatic cylinder 30 connected with a linkage 32 to second rail 26. Air cylinder 30 is a dual action cylinder such that air can be admitted on either side of a piston (not shown), and thus can longitudinally position second rail 26. With the positioning of rail 26, the longitudinal motion is transferred by rack 56 to rotatable motion of the two pinions 78. Pinions 78, in turn, simultaneously move the rack 56 of first rail 24 in the opposite longitudinal direction from second rail 26. Longitudinal bearings 116 and 118 engaging the outer surfaces of rails 24 and 26 permit the smooth and accurate transfer of motion from rail 26 to rail 24. In addition, roller bearings 80 and 82 engage the inward bearing surfaces of first and second rails 24 and 26 to maintain alignment and provide frictionless slidable and longitudinal movement. Preload screws 110 engage linear bearing 116 and press it against first rail 24, which in turn presses against roller bearings 80 and 82 which transfer the compression to second rail 26 and linear bearing 118. Because upper and lower bushings 74 and 76 are mounted in transversely elongated mounting holes and because of the transverse resiliency inherent in conventional linear bearings, pinion and roller bearing subassembly 70 can self align in the transverse direction based on the preload forces applied by screws 110.

Figure 7:
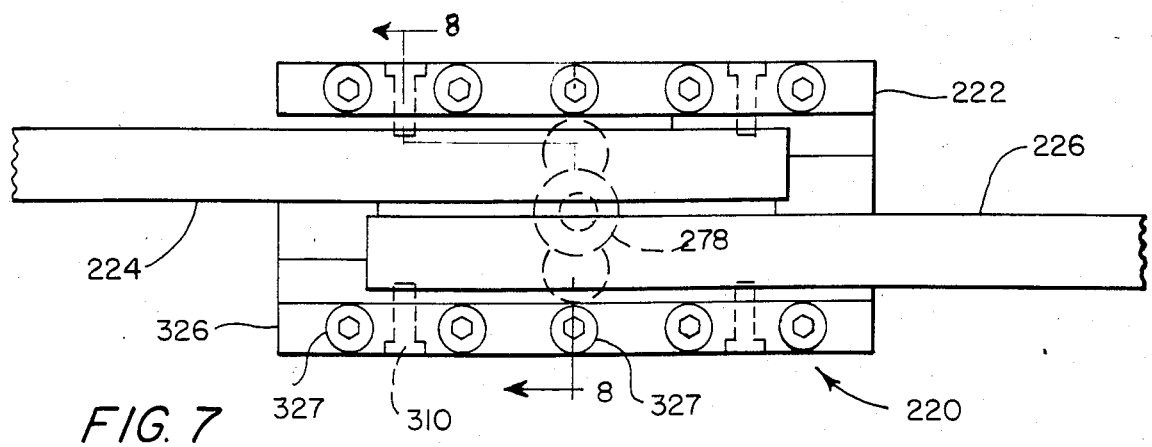
FIG. 7 is a top plan view with some parts removed of a gripper assembly according to an alternative embodiment.

Referring now to FIGS. 7 and 8, a second embodiment of a gripper 220 is depicted in accordance with the present invention. Gripper 220 comprises a U-shaped or channel housing 222 preferably made of 7075-T6 aluminum having exemplary dimensions of 1.750 inches tall by 2.50 inches wide by 5.25 inches long. Slidably mounted in housing 222 are two single piece rails, a first rail 224 and a second rail 226, each rail having a vertical inner side and a V-shaped outer side. Rails 224 and 226 have exemplary dimensions of 7.25 inches in length and 1.25 inches in height. Rails 224 and 226 are tapped and threaded along their bottom sides as seen in FIG. 8 for receiving screws which respectively mount racks 256' and 256". Racks 256' and 256" extend along the entire bottom length of their corresponding rails and extend transversely from the outward side of the rail to a point spaced from the inward side of the rail so as to accommodate the pitch diameter and tooth mesh of pinion 278. The outward side of each rack has a 45° slant to provide a compact fit in the housing. Rails 224 and 226 are preferably made of tool steel for a heavy duty version, of 7075-T6 aluminum for a medium duty version.

Two linear needle roller bearings in a hinged flat case assembly engage the outward surfaces of the V-shaped sides of rails 224 and 226 and are kept in place by two corresponding guides 324. Guides 324 have flat outward surfaces having a 5° angle with the vertical, and V-shaped inward surfaces having a 30° angle with the vertical to correspond with the outer surfaces of rails 224 and 226. Roller bearings 316 and 318 can be of the type manufactured by INA Series FF with plastic cages or Series BF with metal cages. Such bearing assemblies eliminate the so-called stick-slip effect and ensure smooth running for all engaging surfaces. These bearings have double row cages connected by flexible webs which permit the two rows to be bent to any required angle relative to one another so that the unit can be used as an angular contact bearing.

Guides 324 are held in place by corresponding clamps 326 that are rigidly fastened to the top of each channel side with screws 327. Each clamp extends over the top of the corresponding channel side and engages the top of the corresponding guide 324. In addition, guides 324 are secured with two screws 310 to the inward sides of channel housing 222. Thus, guides 324, bearings 316, 318, 320, and rails 224 and 226, are adjustably preloaded in the transverse direction by adjusting the clamp screws 327, and then locking in place with screws 310.

A pinion and bronze bearing subassembly is centrally mounted in the base of housing 222. The subassembly comprises a pinion shaft 272 having a centrally mounted pinion 278. Pinion 278 has teeth with a spacing and shape to engage the teeth of racks 256' and 256". Pinion shaft 272 is mounted eccentrically in a bushing that in turn is mounted in a hole in the bottom of housing 222 and retained therein by screws. The eccentric mounting of the pinion shaft allows transverse adjustment of the pinion for proper pinion and rack gear tooth mesh.

Thus, the alternate embodiment of the invention depicted in FIGS. 7 and 8 is simpler in design, uses simpler, cheaper and more easily obtainable linear bearings, and does not have the complicated interface between rails 24 and 26 of the first embodiment of the present invention. This alternate design is simpler because the channels and holes are straight cuts. However, it is more compact and narrower than the first embodiment of the present invention and thus can find applications where the hands of robots must fit in narrow spaces.

With reference now to FIGS. 9 and 10, alternate drive schemes are depicted for a gripper similar to that depicted in FIGS. 1 through 6.

Grippers 520 and 720, like gripper 20, are respectively comprised of housings 522 and 722 which slidably mount first rails 524 and 724 and second rails 526 and 726 for reciprocal motion in the longitudinal direction (into and out of the paper as shown in FIGS. 9 and 10). A gripper finger is mounted to each rail 524 and 526 and 724 and 726 (only gripper fingers 562 and 762 mounted to rails 524 and 724 are shown), and has a rubber pad finger portion, 566 and 766 respectively, mounted thereto. Corresponding pinions 578 and 778 are respectively mounted in upper and lower bearings 580 and 582 and 780 and 782, which are mounted in turn in housings 522 and 722, respectively. Housings 522 and 722 are also respectively provided with preload screws 610 and 810 which are used to apply preload to linear bearings 616 and 618 and 816 and 818.

Grippers 520 and 720 depicted respectively in FIGS. 9 and 10 utilize stepping motors or D.C. servo motors, such as stepping motor 531 for gripper 520 in FIG. 9 and a pancake stepping motor 731 for gripper 720 depicted in FIG. 10. Housings 522 and 722 have depending sides 528 and 628, respectively, with tapped holes for mounting to the wrist of a robot and for mounting the corresponding stepping motors 531 and 731.

Stepping motor 531 in FIG. 9 is coupled with a belt to a lead screw-ball nut assembly 533 rigidly mounted to first rail 524 with a linkage 532. On the other hand, gripper 720 utilizes a gear connection comprising a pinion gear 635 to connect stepping motor 731 to a gear connected to the bottom of pinion shaft 772.

In FIG. 11, a gripper assembly 919 is comprised of two grippers 920a and 920b that are stacked back-to-back to form a two-handed gripper with wide throw and low weight.

Grippers 920a and 920b are substantially similar to each other and to gripper 20 (FIGS. 1–14 6). Gripper 920a and 920b are mounted to opposite sides of a mounting plate, and thus to each other in a back-to-back relationship, with mounting screws 923. Grippers 920a and 920b are respectively comprised of housings 922a and 922b which slidably mount first rails 924a and 924b and second rails 926a and 926b for reciprocal motion in the longitudinal direction. A motive means for respectively operating first gripper rails 924a and 924b are air cylinders 930a and 930b connected to their respective gripper rail by a linkage 932a and 932b. Housings 922a and 922b are also respectively provided with preload screws 1010a and 1010b which are used to apply a preload to linear bearingts 1016a and 1018a and 1016b and 1018b. An exemplary weight is only 11 pounds and an exemplary overall height without the fingers is only approximately 8 cm. Grippers 920a and 920b are independently; driven by independently operable and mounted cylinders 930a and 930b in a manner substantially similar to gripper 20 (FIGS. 1–6); Spacer plate 921 has an exemplary thickness of only 1.5 cm.

Accordingly, a versatile and high performance general purpose gripper for robots has been described. The gripper utilizes the split rail design concept with preloaded, recirculating ball linear slides and roller bearings exclusively without any links or sliding rails. This mounting design provides a minimum of sliding friction. Tests and measurements of prototypes demonstrate that the design is compact and light enough to use on small payload robots, yet has the performance characteristics necessary for use on large payload robots. The grippers can be opened and closed easily, even when subjected to side torques of as much as 100 in-lbs. The present invention is not only simple and inexpensive to manufacture, it is also versatile in the use of the actuators. Thus, actuators can include pneumatic pistons or electric stepping motors and D.C. servo motor systems. The gripper is smooth acting, has repeatability of 0.001 inches, has parallel action and is responsive to air pressure variations in the pneumatic actuated embodiment of as low as 5 psig. As shown in FIG. 11, the grippers are easily reconfigured in a modular manner to satisfy any number of rolls in a manufacturing environment.

Other modifications and changes would be obvious to those of ordinary skill in the art. For example, a shield or bellows can easily be fitted onto the grippers to protect them from flying chips and other adverse elements in the manufacturing environment. Still further modifications would be obvious to those of ordinary skill in the art.

We claim:

1. A gripper comprising:
   a frame;
   a parallel rack and pinion drive subassembly comprising a pinion rotatably mounted on said frame, a first elongate rail and a second elongate rail mounted parallel to each other in operable engagement on corresponding sides of said pinion, said rails having an inner bearing surface along at least part of the lengths thereof on the inner sides thereof facing said pinion and an outer bearing surface on the outer sides opposite said rail inner sides;
   a first gripper finger mounted to said first rail;
   a second gripper finger mounted to said second rail;
   a first linear bearing mounted on said frame for engaging one of said inner and outer bearing surfaces of said first rail;
   a second linear bearing mounted on said frame for engaging one of said inner and outer bearing surfaces of said second rail; and
   bearing means mounted on said frame for engaging the other of said inner and outer bearing surfaces of said first and second rails.

2. A gripper as claimed in claim 1 wherein said first and second linear bearings engage the corresponding outer surfaces of said first and second rails and said bearing means engages the corresponding inner surfaces of said first and second rails.

3. A gripper as claimed in claim 2 wherein said bearing means comprises a roller bearing that engages both said inner bearing suface of said first rail and said inner bearing surface of said second rail.

4. A gripper as claimed in claim 1 wherein said bearing means comprises a roller bearing that engages both said inner bearing surface of said first rail and said inner bearing surface of said second rail.

5. A gripper as claimed in claim 4 wherein said pinion is rigidly mounted to a shaft that in turn is rotatably mounted on said frame; and wherein roller bearing is mounted on said pinion shaft.

6. A gripper as claimed in claim 5 wherein said bearing means comprises a first and a second roller bearing each mounted on said pinion shaft.

7. A gripper as claimed in claim 6 wherein said first and second roller bearings on either side of said pinion and wherein said first and second roller bearing each engages both said inner bearing surface of said first rail and said inner bearing surface of said second rail.

8. A gripper as claimed in claim 1 and further including means for preloading said first and second linear bearings.

9. A gripper as claimed in claim 8 and further including a pinion shaft; and
   means for mounting said pinion shaft on said frame in a direction that is perpendicular to said plane defined by said rails, said mounting means including at least one bushing mounted in said frame in an orifice having an elliptical cross section the major axis of which extends in the direction transverse to the longitudinal direction defined by said rails; and wherein said preloading means exerts a force in the transverse direction.

10. A gripper as claimed in claim 1 wherein said first and second gripper fingers are mounted on either side of said pinion.

11. A gripper as claimed in claim 1 and further including power means attached to one of said rails for moving said one of said rails in the longitudinal direction.

12. A gripper as claimed in claim 1 and further including power means connected to said pinion for rotating said pinion and thereby simultaneously moving said rails in the longitudinal direction.

13. A gripper as claimed in claim 1 and further including a second pinion rotatably mounted on said frame, spaced longitudinally from said first mentioned pinion, and in operable engagement with both said rails.

14. A gripper as claimed in claim 1 wherein said first and second rails each have a cross section that is rectangular with a V-notch in the outer side thereof which engages the corresponding one of said linear bearings.

15. A gripper as claimed in claim 14 wherein said first and second rails each further comprises an elongate toothed rack member integral therewith and having a toothed portion extending along the bottom thereof such that the toothed portion of said rack member engages one side of said pinion.

16. A gripper as claimed in claim 1 wherein said frame comprises a U-shaped housing having a base and substantially parallel, upstanding, sides integral with said base; and wherein said rails, said linear bearings and said bearing means are mounted between said upstanding sides.

17. A gripper for engaging an article comprising:
    a frame;
    first and second elongate rails defining a longitudinal axis, said rails mounted along side each other in a transverse plane in said frame for reciprocal movement in said longitudinal axis, said first and second rails comprising respectively first and second rack portions in a mutually opposing relationship in the transverse plane, and said rails comprising respectively first and second gripper means for together mutually engaging an article; said rails thus having outsides and insides in said transverse direction;
    a pinion rotatably mounted in said frame between and in operable engagement with said rack portions, the axis of said pinion being perpendicular to both said longitudinal axis and said transverse axis; and
    first, second and third bearing means mounted on said frame along said transverse direction for engaging said outsides and said insides of said first and second rails.

18. A gripper as claimed in claim 17 and further including means for preloading said first, second and third bearing means and said first and second racks in said transverse direction.

19. A gripper as claimed in claim 18 and further including means for mounting said pinion in said frame so as to permit linear movement of said pinion in the transverse direction, but to prevent movement of said pinion in the longitudinal direction.

20. A gripper as claimed in claim 19 wherein said first bearing means comprises a linear bearing mounted for engaging said outside of said first rail; said second bearing means mounted for engaging both said first rail inside and said second rail inside; and said third bearing means comprises a linear bearing mounted for engaging said outside of said second rail.

* * * * *